(12) United States Patent
Bailey

(10) Patent No.: US 12,280,423 B2
(45) Date of Patent: Apr. 22, 2025

(54) BIOCIDAL COMPOSITIONS OF COPPER AND SILVER AND PROCESS FOR ADHERING TO PRODUCT SUBSTRATES

(71) Applicant: COVALENT COATING TECHNOLOGY, INC., East Hartford, CT (US)

(72) Inventor: Orville Bailey, East Hartford, CT (US)

(73) Assignee: COVALENT COATING TECHNOLOGY, INC., East Hartford, CT (US)

( * ) Notice: Subject to any disclaimer, the term of this patent is extended or adjusted under 35 U.S.C. 154(b) by 89 days.

(21) Appl. No.: 17/997,863

(22) PCT Filed: May 6, 2021

(86) PCT No.: PCT/US2021/031133
§ 371 (c)(1),
(2) Date: Nov. 3, 2022

(87) PCT Pub. No.: WO2021/226362
PCT Pub. Date: Nov. 11, 2021

(65) Prior Publication Data
US 2023/0174794 A1 Jun. 8, 2023

Related U.S. Application Data

(60) Provisional application No. 63/022,099, filed on May 8, 2020.

(51) Int. Cl.
*A01P 1/00* (2006.01)
*A01N 25/10* (2006.01)
(Continued)

(52) U.S. Cl.
CPC ............. *B22F 1/09* (2022.01); *A01N 25/10* (2013.01); *A01N 59/02* (2013.01); *A01N 59/20* (2013.01);
(Continued)

(58) Field of Classification Search
None
See application file for complete search history.

(56) References Cited

U.S. PATENT DOCUMENTS 4,508,568 A * 4/1985 Fox ................ A01N 61/02
106/270
4,581,298 A * 4/1986 Fox .................. B27K 3/36
427/393

(Continued)

FOREIGN PATENT DOCUMENTS

CN 1384709 A 12/2002
CN 101716526 A 6/2010
(Continued)

OTHER PUBLICATIONS

Hamid Reza Ghorbani, "Biological Coating of Paper Using Silver Nanoparticles", IET Nanobiotechnol, vol. 8, Iss. 4, pp. 263-266, 2014.

(Continued)

*Primary Examiner* — Peter A Salamon
(74) *Attorney, Agent, or Firm* — LUCAS & MERCANTI, LLP

(57) ABSTRACT

Biocidal metallic compositions and films, and methods for making and adhering biocidal compositions and films to surfaces requiring continued protection without requiring frequent cleaning are disclosed. The biocidal compositions may include metals, such as copper or silver powder, which are applied to the exposed surface of a variety of different resins, glues, epoxies, solvents or other surface treatments to (Continued)

create a biocidal film over the surface of product substrates including metals, leathers, papers, plastics, cardstocks, and glass surfaces.

8 Claims, 3 Drawing Sheets

(51) Int. Cl.
| | |
|---|---|
| A01N 59/02 | (2006.01) |
| A01N 59/20 | (2006.01) |
| B22F 1/00 | (2022.01) |
| B22F 1/05 | (2022.01) |
| B22F 1/10 | (2022.01) |
| B22F 1/105 | (2022.01) |
| B22F 1/12 | (2022.01) |
| B22F 7/04 | (2006.01) |
| C09D 5/14 | (2006.01) |
| C09D 7/40 | (2018.01) |
| C09D 7/61 | (2018.01) |

(52) U.S. Cl.
CPC ............... *A01P 1/00* (2021.08); *B22F 1/05* (2022.01); *B22F 1/10* (2022.01); *B22F 1/105* (2022.01); *B22F 1/12* (2022.01); *B22F 7/04* (2013.01); *C09D 5/14* (2013.01); *C09D 7/61* (2018.01); *C09D 7/69* (2018.01); *B22F 2301/10* (2013.01); *B22F 2302/45* (2013.01); *B22F 2303/40* (2013.01); *B22F 2304/10* (2013.01); *B22F 2998/10* (2013.01); *B22F 2999/00* (2013.01)

(56) References Cited

U.S. PATENT DOCUMENTS

| | | | |
|---|---|---|---|
| 7,635,659 B2 | 12/2009 | Naganuma et al. | |
| 7,745,509 B2 | 6/2010 | Burton et al. | |
| 7,863,264 B2 | 1/2011 | Vange et al. | |
| 8,318,282 B2 | 11/2012 | Ylitalo et al. | |
| 8,563,020 B2 | 10/2013 | Uhlmann et al. | |
| 8,592,045 B2 | 11/2013 | Olsson | |
| 8,852,689 B2 | 10/2014 | Srinivas et al. | |
| 9,539,371 B2 | 1/2017 | Wen et al. | |
| 10,212,932 B2 | 2/2019 | Chiattello et al. | |
| 10,525,614 B2 | 1/2020 | Lau et al. | |
| 10,611,679 B2 | 4/2020 | Veerasamy | |
| 10,625,495 B2 | 4/2020 | Kikuchi | |
| 2003/0096017 A1 | 5/2003 | Decker et al. | |
| 2010/0034900 A1* | 2/2010 | Temchenko | C09D 7/62 424/618 |
| 2012/0124886 A1 | 5/2012 | Hopkins | |
| 2015/0056258 A1 | 1/2015 | Richardson et al. | |
| 2016/0206769 A1* | 7/2016 | Zeiger | A61L 2/238 |
| 2016/0309709 A1 | 10/2016 | Cok et al. | |
| 2017/0120198 A1* | 5/2017 | Elimelech | B01D 67/00933 |
| 2017/0347662 A1 | 12/2017 | Penari | |
| 2019/0000088 A1* | 1/2019 | Portman | B22F 1/10 |
| 2019/0127272 A1 | 5/2019 | Veerasamy | |
| 2019/0246644 A1 | 8/2019 | Gomez Alvarez et al. | |
| 2020/0299843 A1* | 9/2020 | Botef | C23C 24/04 |

FOREIGN PATENT DOCUMENTS

| | | |
|---|---|---|
| CN | 110804362 A | 2/2020 |
| JP | H11271994 A | 10/1999 |
| JP | 2003160745 A | 6/2003 |
| WO | 2007095058 A2 | 8/2007 |
| WO | 2019064216 A1 | 4/2019 |
| WO | 2019160367 A1 | 8/2019 |

OTHER PUBLICATIONS

Simona Liliana Iconaru, et al., "Antimicrobial Activity of Thin Solid Films of Silver Doped Hydroxyapatite Prepared by Sol-Gel Method", The Scientific World Journal, vol. 2014, pp. 1-8.
Deepak Patil, et al., "Fabrication of Silver Nanoparticles-Embedded Antibacterial Polymer Surface Through Thermal Annealing and Soft Molding Technique", Materials Research Express, vol. 6, No. 4, pp. 1-8, 2019.
Tsung-Ting Tsai, et al., "Antibacterial Cellulose Paper Made With Silver-Coated Gold Nanoparticles", Scientific Reports, vol. 7, pp. 1-10, 2017.
"InviroShield Antimicrobial surface protection film", ATHENS paper packinging whide format, 2 pages.
International Search Report and Written Opinion for International Application No. PCT/US2021/031133 (11 Pages) (Aug. 4, 2021).
Extended European Search Report for Corresponding European Application No. 21800138.6 (9 Pages) (Sep. 27, 2023).

\* cited by examiner

BIOCIDAL COMPOSITIONS OF COPPER AND SILVER AND PROCESS FOR ADHERING TO PRODUCT SUBSTRATES

CROSS-REFERENCE TO RELATED APPLICATIONS

This application is a 371 of PCT/US2021/031133, filed May 6, 2021, which claims the benefit of U.S. Provisional Patent Application No. 63/022,099, filed May 8, 2020, the contents of each of which are incorporated herein by reference.

FIELD OF INVENTION

The field relates to metallic biocidal compositions including, for example, elemental copper, silver, gold and various compounds and salts of these metals and processes for adhering such biocidal compositions to a variety of resin-treated substrates, such as papers, polymers including plastics, metals, leathers or wooden surfaces.

BACKGROUND OF THE INVENTION

Bacterial and viral contamination of surfaces through human interactions and traffic remains a pervasive problem. Currently, the novel coronavirus, i.e., the SARS-CoV-2 virus, showed an immediate need for surfaces with lasting antimicrobial protection in places such as public transportation, hospitals, clinics, restaurants, shipping containers and home environments. For example, studies have shown that the SARS-CoV-2 virus remains viable and infectious on paper surfaces for up to 24 hours, and on metal surfaces for up to 3 days.

Certain metals, such as transition metals of the d-block of the periodic table of elements (V, Ti, Cr, Co, Ni, Cu, Zn, Tb, W, Ag, Cd, Au, Hg) and compounds or salts incorporating these metals have well-established antimicrobial properties and safety profiles. For example, copper is non-toxic and is a widely used in food preparation and plumbing for its antimicrobial properties, while colloidal silver is used in antiseptic solutions and dietary supplements. While these metals can be used to craft antimicrobial products, they cannot be used to make all products. For example, these metals are expensive and it is often cost-prohibitive for use on products or surfaces that would otherwise benefit from antimicrobial treatment. These metals may also be undesirable for many applications, including doctors' examination tables which would feel too cold on patients' bare skin.

Antimicrobial metals have been used in many products that mix the metals with a liquid media or carrier. For example, references known in the art provide examples of antimicrobial metals being mixed with lacquer, glue, epoxy, plastics, polymers, rubbers and other media that can be die casted, painted, poured or otherwise shaped into or onto surfaces. The issue with these references is that antimicrobial metals need to make direct contact with virus, bacteria and other harmful microbes in order to kill or inhibit their growth or viability. As a result, these compositions that mix and partially or completely bury antimicrobial metals in a substrate do not provide antimicrobial activity as strong as that of pure antimicrobial metal, such as pure copper metal.

It is believed that there has not been metallic biocidal compositions or processes that approximate, match or outperform the antimicrobial power of pure antimicrobial metal, such as copper, in an inexpensive manner. Further, it is believed that there has not been compositions or processes that incorporate clear, translucent, or otherwise see-through metallic antimicrobial coatings. There remains a need to develop such cost-effective non-toxic metallic antimicrobial compositions and methods for depositing such compositions on different surfaces.

SUMMARY OF THE INVENTION

The present invention comprises antimicrobial metallic compositions and films, and methods for making and adhering antimicrobial compositions and films to surfaces requiring continued protection without requiring frequent cleaning. The antimicrobial compositions may comprise antimicrobial metals, such as copper or silver powder, applied to the exposed surface of a variety of different resins, glues, epoxies, solvents or other surface treatments to create a biocidal film over the surface.

Applicants disclose several preferred and alternative metallic antimicrobial compositions and biocidal films, and methods for depositing such films on polymeric surfaces including plastic surfaces and a variety of other surfaces including, by way of example, metals, leathers, papers, plastics, cardstocks, and glass surfaces. Such methods serve to create a bond of metallic antimicrobial compositions, such as those comprising copper or silver powder, onto a surface to create a biocidal film which meets desired characteristics for its application, including desired durability, antimicrobial efficacy, and clarity. One or more embodiments of the invention relate to the creation of photoconductive copper-containing antimicrobial compositions that adheres high surface area copper and selenium powder in close association to the surface of a resin-treated substrate.

One advantage of the enhanced antimicrobial power of the presently disclosed compositions and methods of applying these compositions is that minimized application of composition to a given surface can occur. This application can be limited to a very fine layer less than a micrometer in depth or can be several millimeters thick. Some embodiments may comprise a dispersion of composition having space between composition particles allowing for a cost-effective, durable, non-toxic and, in some embodiments, clear or otherwise see-through metallic antimicrobial surface.

In one or more preferred embodiments, transparency and antimicrobial power of an applied composition and resin on a product substrate may be optimized with a series of micro ridges having concentrated antimicrobial composition at repetitive high points of the surface with areas of repetitive low points or valleys between the ridges having little or no coating of composition.

In some embodiments, a surface coating for a product substrate may include a antimicrobial composition which includes powders of one or more core metals including, without limitation, copper, silver and gold. The powders used in the antimicrobial composition may have a particle size of between 5 to 100 micrometers. The amount of core metals used in the antimicrobial composition may range from about 1% to about 100% by weight of the antimicrobial composition. The antimicrobial composition may optionally comprise other ingredients including, for example, resins and photoconductive additives.

Several embodiments may include photoconductive additives comprising one or more of the following: selenium and selenium powders; compounds of selenium and powders of compounds of selenium; salts of selenium and powders of the salts of selenium; oxides of core metals; halides of the core metals; thallous oxide; carbazole-containing polymers; and triarylamine-containing polymers; wherein the surface coating forms a biocidal film on the surface of the product substrate.

Exemplary methods of forming biocidal films on product substrate surfaces may include: a step of providing a product substrate; a step of preparing a product substrate for coating by treating its surface with at least one organic solvent; drying the surface to a tackiness level of 3 as measured by a probe tack method or equivalent methods having the same tackiness level; treating the product substrate with least one low viscosity resin having a viscosity between 50 to 450 centipoise; drying the low viscosity resin to a tackiness of 3 as measured by the probe tack method or equivalent methods having the same tackiness level; depositing a biocidal composition onto the resin surface comprising a powder of core metal of one or more of copper, silver and gold, wherein the powder has a particle size of 5 to 100 micrometers and a weight percentage of core metal in a range of about 10% to 100% by weight of the composition; and optionally, a photoconductive additive.

Many embodiments of antimicrobial compositions may comprise photoconductive additives. These photoconductive additives may comprise one or more of the following: selenium and selenium powders; compounds of selenium and powders of compounds of selenium; salts of selenium and powders of the salts of selenium; oxides of the core metal; halides of the core metal; thallous oxide; carbazole-containing polymers; and triarylamine-containing polymers.

In one or more embodiments, a step of creating a biocidal film on a product substrate may comprise applying the biocidal composition onto a resin-treated product substrate surface or applying a blend of the biocidal composition and an intermediary resin onto the product substrate surface. Once the biocidal film is applied, the film may be dried in ambient temperature and pressures, or optionally thermally treated by applying heat and pressure to the biocidal film and product substrate.

In some embodiments, a surface coating for a product substrate may comprise: at least one clear resin residing on a surface of the product substrate; and at least one biocidal composition comprising up to about 90% by weight copper powder having a particle size of about 10 to 100 micrometers and up to about 10% by weight of selenium powder having a particle size of about 10 to 100 micrometers; and the at least one biocidal composition being disposed on a surface of the at least one clear resin to create a biocidal film.

The antimicrobial compositions, resins, ingredients, and application methods discussed herein can be combined in any manner to create powerful metallic biocidal films, with many embodiments allowing visibility of underlying product substrate trademarks and graphics.

It is one object of this invention is to reduce the spread of harmful viral and bacterial infections with see-through metallic antimicrobial coatings with biocidal power that approximates pure copper metal. Yet another object of this invention to create durable inexpensive antimicrobial compositions that can be widely applied to a variety of different surface types and product substrates without using large amounts of metals or other substrates. Still another object of this invention is to create antimicrobial films that reduce the need for the application of harmful antimicrobial chemical cleaners, such as quaternary ammonium compounds ("quats"). These cleaners may further contain other harmful compounds such as volatile organic compounds ("VOCs"), propellants, carcinogens, nerve-reactive agents, or other toxic organic and inorganic ingredients.

BRIEF DESCRIPTION OF THE DRAWINGS

The above objects and other advantages of the invention will become more readily apparent upon reading the following description and drawings, in which.

DETAILED DESCRIPTION

Figure 1:
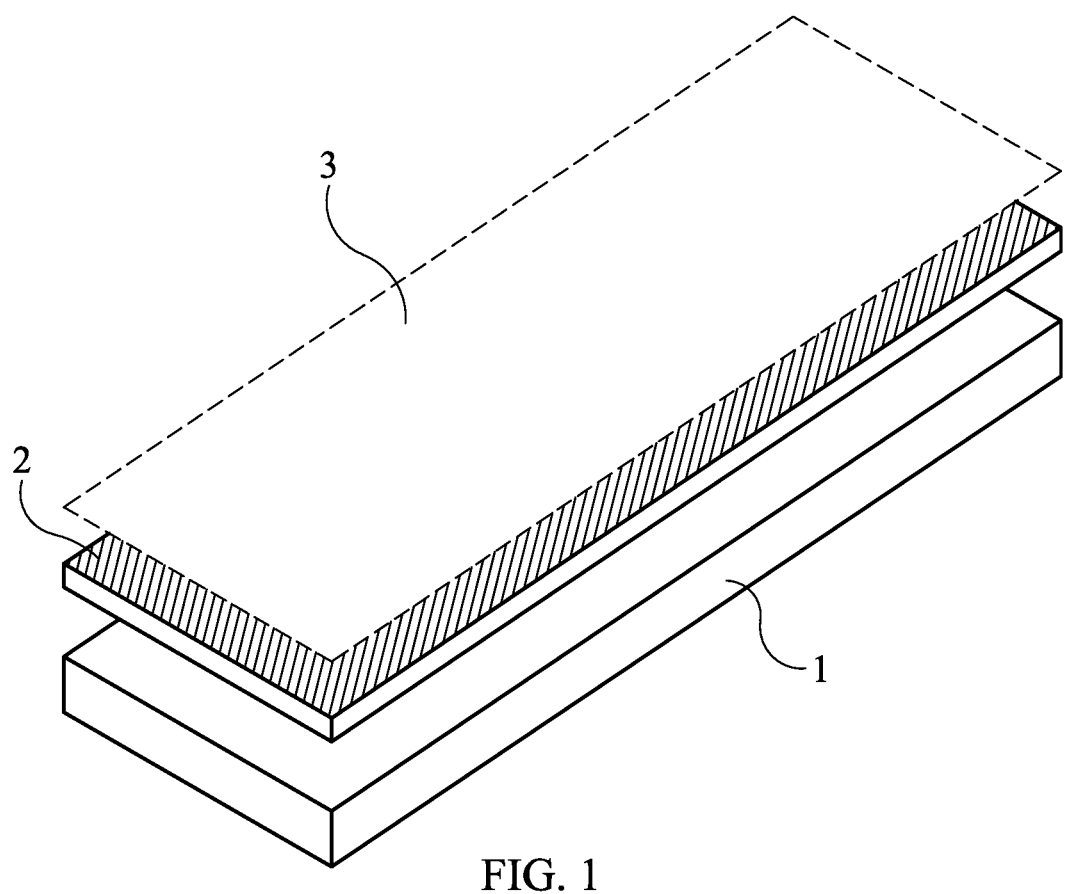
FIG. 1 is a schematic cross section showing components of a biocidal film according to one embodiment of the present disclosure.

The examples and drawings provided in the detailed description are merely examples and should not be used to limit the scope of the claims in any claim construction or interpretation.

Definitions

As used herein, the terms "antimicrobial coating," "antimicrobial composition," "biocidal composition," and "composition" are used interchangeably to mean any biocidal, antimicrobial, or antiviral composition comprising additives with biocidal, antimicrobial, antiviral, or photoconductive properties including, for example, copper, silver, selenium, and compounds or salts thereof. These terms incorporate the definition of antimicrobial and biocidal provided herein.

The terms "antimicrobial film," "biocidal film" or generally "film" are used interchangeably to refer to one or more antimicrobial and antiviral compositions imbedded onto the surface of a product substrate or onto the surface of an intermediary resin. These terms incorporate the definition of antimicrobial and biocidal provided herein.

The terms "antimicrobial" and "biocidal" are used interchangeably to mean destroying, rendering harmless, or inhibiting microscopic organisms, such as bacteria, molds, and fungi, and submicroscopic infectious agents, such as viruses and prions, by killing or otherwise disrupting their biological functions, proteins, membranes, infectiousness, pathogenicity, colony growth, or overall viability. The terms "antimicrobial" and "biocidal" as used in the specification are intended to be broader than conventional meanings as indicated by the foregoing definition.

The terms "coat," "impregnate," "treat," "imbed," "embed," "adhere," "affix," "bond," "fuse," "disperse," and "apply" are used interchangeably and generally refer to permanently, semi-permanently, or temporarily fixing one surface to another. For example, in one or more embodiments, a sheet or tape with a biocidal film permanently bonded to its surface may optionally have a lower surface with a temporary adhesive which may be replaceably applied to a surface, such as a door handle, requiring antibacterial, antiviral and antifungal treatment.

The terms "micro ridges," "ridges," and "peaks" are used interchangeably to mean small, raised areas of antimicrobial composition or biocidal film on a product substrate such as raised lines, curves, rows, shapes, spots or other repetitive patterns with areas of repetitive "low points" or "valleys" with less composition or no biocidal film between the ridges. In preferred embodiments, the ridges and valleys should be spaced such that people touching the surface make contact with only the ridges to maximize antimicrobial power, while the valleys allow for maximized passage of light and clarity through the composition to see the underlying product substrate.

The term "photoconductive additive" is used interchangeably with "photoconductive elements" and "photoconductive compounds," and means additives that are capable of ionization in the presence of light, or that otherwise help disperse light within a biocidal film, to improve the film's biocidal power.

The term "product substrate" means any physical surface on which a biocidal film may be added. Product substrates may include, for example, papers, plastics, ceramics, glasses, metals, leathers, wooden, and any surface that may be treated with an intermediary resin.

The terms "resin," "resin-treated," "resin layer," "resin substrate," "intermediary substrate," "solution," "matrix," and "intermediary resin" are used interchangeably and mean any intermediary resin, epoxy, adhesive, polymers, glue, cement, thermoplastic, urethane, acrylate, silicone, or other layer that may form a biocidal film over a product substrate by bonding to the surface of a product substrate, and to one or more antimicrobial compositions embedded on the resin surface. In some embodiments, resin may also comprise a blend with one or more antimicrobial compositions in addition to one or more antimicrobial compositions embedded on the resin surface.

The term "surface coating" includes biocidal films and may include pigments, solvents and other additives which may optionally be incorporated into or onto the biocidal film. The term "surface coating" can include, for example, paints, dyes, ink, drying oils, varnishes, and other materials that can modify the appearance of, protect, or otherwise enhance the biocidal film.

The terms "clear," and "see-through" are used interchangeably to mean having sufficient clarity to see through, or allowing ambient light to pass through, the biocidal film applied to a product substrate. The terms clear and see-through have broad definitions and include both transparent and translucent applications. For example, without limitation, clear or see-through biocidal films may be sufficiently clear to see writing, logos, or other characteristics present on the underlying product substrate surface. In several embodiments, the underlying product substrates may also be clear (such as transparent tapes or films to which film is applied) such that these product substrates may be applied to other surfaces that may remain visible.

Core Metals

Core metals are antimicrobial metals and compounds thereof that may be added to an antimicrobial composition. Exemplary core metals that may be used in the claimed antimicrobial compositions comprise those elements within the d-block of the periodic table of elements (V, Ti, Cr, Co, Ni, Cu, Zn, Tb, W, Ag, Cd, Au, Hg) and compounds or salts thereof. Some metals and metalloids and compounds or salts thereof from groups 13-16 of the periodic table (Al, Ga, Ge, Sn, Sb, Te, and Bi) may also be used in the claimed composition.

In some preferred embodiments as disclosed in the specification, compositions and methods may comprise copper, silver and other elements of Group 11 of the Periodic Table. Preferably metals used in compositions have excitable electrons in an outer orbital band that have the ability to disrupt the bilipid layer membrane and cellular function of microbes. Group 11 elements are defined herein as copper, (Cu), silver (Ag), and gold (Au).

Antimicrobial Compositions

To enhance the biocidal activity of core metals, it was discovered that one or more core metals may be combined with other ingredients into an antimicrobial composition that may be dispersed onto the outer surface of a product substrate or an intermediary resin. It was discovered that maximizing contact and ionic interaction of the composition particles with microbes provides improved kill rates. In preferred embodiments, the resin may optionally be mixed with antimicrobial composition in addition to embedding composition onto the intermediary resin surface. Having a continuous or semi-continuous layer of antimicrobial composition residing on the surface of a product substrate or resin provides advantages over references known in the art that discloses submerging of core metals in glue, paint, or other carriers that masked the ionic and biocidal effects of the metals.

Exemplary compositions may comprise a blend of one or more antimicrobial core metals preferably in powdered form. Antimicrobial compositions may preferably comprise, but are not limited to, antimicrobial Group 11 elements. Compounds or salts containing Group 11 elements preferably include elements with electronegativities greater than that of the Group 11 elements to increase their ionic potential.

Photoconductive Additives

In some preferred embodiments, the antimicrobial composition optionally comprise photoconductive additives. The composition may then react with ambient light to release ions thus charging the antimicrobial metals to enhance antimicrobial power. Photoconductive additives include elements, compounds or salts. Several other elements and compounds or salts may be used in combination with copper to further enhance its antimicrobial power, including embodiments comprising electronegative salts, such as copper oxides and copper halides, for example.

Several preferred embodiments of the present antimicrobial compositions may optionally comprise photoconductive elements or compounds. Photoconductive additives may include both photoconductive elements and compounds thereof that ionize with ambient light and improve the oxidation or ionization of the antimicrobial composition to improve its biocidal power. Photoconductive additives may also include photoconductive polymers that may improve oxidation or ionization or disperse light through an antimicrobial composition to improve its biocidal power.

Oxides and halides of core metals as photoconductive additives. It was discovered that compounds with electronegative characteristics improve the photoconductive effect including, without limitation, oxides of core metals such as copper oxide, thallous oxide, silver oxide, zinc oxide, halides of core metals such as copper chloride, copper bromide, copper iodide, copper fluoride, silver oxide, and silver bromide.

Selenium as a photoconductive additive. Preferred embodiments of photoconductive additives include selenium and selenium compounds and salts such as copper selenide. Surprisingly and unexpectedly, Selenium provides a synergistic effect to the antimicrobial power of Group 11 elements, such as copper, through what is believed to be a cascading photoconductive effect. Without being bound by theory, the photoconductive effect emits ions from selenium atoms as a consequence of the absorption of visible or ultraviolet light energy. The selenium atoms, which have greater electronegative charge, can then pass their photoconductive charge to copper thus increasing its overall biocidal capabilities. Selenium does not need to be present in large quantities for this cascading photoconductive effect. Selenium additives may be added to antimicrobial compositions to minimize the amount of core metals needed without significantly compromising antimicrobial power.

For example, in some embodiments, the composition may comprise a blend of copper powder and selenium powder at a ratio of about 95% to about 5% by weight. Selenium powder may be added to a composition at a range of about 0.05% to 75% by weight, but preferably between about 0.5% and 10%, and most preferably between about 1% and 5% by weight. In these compositions, the selenium should be mixed uniformly within the composition to be in close association with core metals.

Photoconductive polymers as photoconductive additives. In some preferred embodiments of antimicrobial compositions with photoconductive additives may additionally include photoconductive polymers such as polyvinyl carbazole. Photoconductive polymers added to a composition with photoconductive elements or compounds help further disperse light throughout the composition to further ionize the core metals, improve the antimicrobial power of the composition, and minimize the amount of composition required in a biocidal film. Photoconductive polymers may comprise 0.5 to 98% by weight of an antimicrobial composition, and preferably about 20 to 75% by weight of the composition.

Some preferred embodiments may comprise selenium and photoconductive polymers. Carbazole-containing polymers such as poly(vinyl carbazole) (PVK) and polysiloxane-based (PSX) polymers are preferred photoconductive polymers. Triarylamine containing side chain polymers, such as poly(acrylic tetraphenyldiaminobiphenyl) (PATPD), are PVK-based examples. Others embodiments may comprise poly(phenylene vinylene) (PPV) copolymers, which have also shown advantageous steady-state performance compared to PVK systems. These and other photoconductive polymers may be added to both the composition and the intermediary resin to allow light to permeate the composition and increase its biocidal effects. In some preferred embodiments, antimicrobial compositions comprise core metals, photoconductive elements or compounds and photoconductive polymers wherein the antimicrobial compositions are mixed into an intermediary resin as well as deposited onto its surface. This allows for significant biocidal and other advantages, including lower materials and manufacturing costs, and the ability to produce see-through copper-based antimicrobial films. Thus several embodiments of this invention include antimicrobial compositions, and methods for coating and embedding minimally effective amounts of antimicrobial compositions to product substrates and intermediary resins that maximize antimicrobial power but remain see-through. By way of example, if using selenium in combination with PVK in a copper-containing antimicrobial composition, the respective weight percentages of selenium, PVK, and copper may be about 5%:35%:60% by weight.

Particle size. The particle size of powdered ingredients of a composition, such as core metals, can vary with smaller particle sizes providing greater surface area for enhanced antimicrobial power. Without being bound by theory, it is believed that minimizing the particle size of copper powder increases the rate of ionic interactions between the particles thus increasing potential biocidal action. In some embodiments, metal powders used in compositions may have a particle size range of about 1 to 1000 micrometers. In preferred embodiments, metals powders have a particle size range of about 5 to 50 micrometers. In other preferred embodiments, the particle size of metal powders is in a range of between 10 to 100 μm. In other preferred embodiments, the particle size of metal powders used in a composition may have a range of between 10 and 45 micrometers. The metal particle size in a given composition may be homogeneous or may be mixed.

Biocidal films. Biocidal films comprise antimicrobial compositions that are imbedded directly onto the surface of a product substrate or onto an intermediary resin which is bound to a product substrate. The goal of the films disclosed herein is to provide antimicrobial surfaces that require minimal maintenance, do not require harsh antimicrobial cleaners, are inexpensive to produce, have high durability, are versatile, and are customizable for different surfaces. By way of example, biocidal films can be applied to a variety of different surfaces, including without limitation paper, plastic, ceramic, glass, metal, leather, wooden, and any other surface that may be treated with an intermediary resin that adheres to both the product substrate and antimicrobial composition.

FIG. 1 depicts exemplary components forming one embodiment of a biocidal film. In this embodiment, product substrate 1 is treated with a resin 2, followed by a biocidal composition 3 that is applied to the surface of the resin 2. In another example (not depicted), the product substrate 1 may be treated with a resin/antimicrobial composition blend 2, followed by an antimicrobial composition 3 applied to the surface. In this example, the antimicrobial composition 3 applied to the surface of the blend 2 may be different than or the same as the antimicrobial composition used within blend 2.

Figure 2:
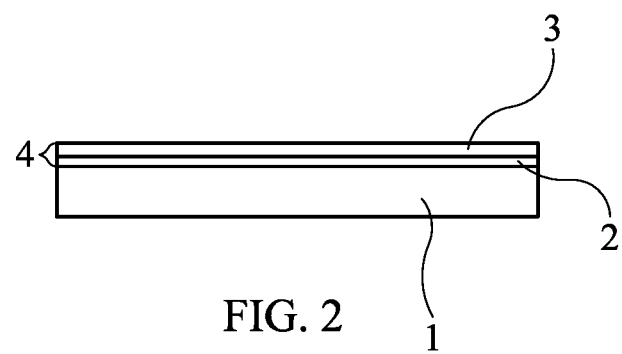
FIG. 2 is a side view of a schematic showing components of biocidal films according to one embodiment of the present disclosure.

FIG. 2 depicts a side-view of the biocidal film. As in FIG. 1, the same components, product substrate 1, resin 2 and biocidal composition 3 are shown. In addition, a formed biocidal film 4 is depicted which comprises biocidal composition 3 and resin 2, and is bonded to the product substrate 1.

General methods of creating biocidal films may comprise the steps of first applying a resin onto a product substrate, then applying an appropriate amount and form of an antimicrobial composition to the surface of the resin. Preferably, antimicrobial compositions will remain bound to the resin surface such that the biocidal film comprises a layer of antimicrobial composition over the layer of resin. In some embodiments, antimicrobial composition may be mixed with resin in addition to being bound to the resin surface. Some methods may comprise application of an aerosol spray of resin to the surface of a product substrate, treatment of that resin layer with antimicrobial composition to create a biocidal film over the product substrate, then thermally processing the film on the substrate.

Thermal processing. Thermal processing may comprise treating a film on a product substrate with pressure and heat, or optionally with pressure or heat. For example, a plastic substrate with a biocidal film may be fed through a heated rolling press to imbed and cure the film onto the surface of the plastic material and to maximize the efficacy and durability of the antimicrobial surface.

Application of Biocidal Films

Biocidal films on Polymeric Product Substrates. In some embodiments, biocidal films may be applied to polymeric product substrates including plastic substrates as generally described above. In a specific example, an intermediary resin can be applied to a plastic product substrate with an aerosol spray, allowed to partially dry so that the surface of the resin remains sufficiently tacky, then treated with a desired amount of antimicrobial composition. Biocidal films on plastic substrates may optionally be thermally processed to maximize the durability and antimicrobial efficacy of the film.

Solvent treatment of polymeric surfaces. In addition to resin-based biocidal films, polymeric surfaces that include plastics may be treated with solvents to imbed antimicrobial compositions, thus creating biocidal films without the need for intermediary resins. For example, plastic surfaces may be treated with solvents that soften the plastic, allowing for direct application of an antimicrobial composition onto the softened product substrate surface. When the plastic rehardens, the composition is imbedded into the plastic forming a solvent-based biocidal film. Solvents such as acetone, ethyl acetate, methyl-ethyl-ketone, tetrahydrofuran, toluene, methylene chloride, dichloroethane, phenol, cresols, hydrocarbon distillates, alcohols, and other organic solvents can be used to soften the plastic surface. In some preferred embodiments, solvents can be mixed to attain desired results. For example, solvents can be mixed with isopropyl alcohol to control the amount of softening and tackiness.

Tackiness. Tackiness as used herein is a measure of temporary and slight adhesiveness sufficient to hold antimicrobial composition, which subsequently hardens to form a permanent biocidal film. For example, a resin added to a product substrate may be dried until tacky, at which point an antimicrobial composition may be deposited onto its surface and allowed to dry to form a permanent biocidal film. Alternatively, solvent applied to plastic product substrate may be allowed to diffuse into the surface of the product substrate and partially evaporate to leave a tacky surface, which is then treated with antimicrobial composition and allowed to dry to form a permanently bonded biocidal film.

Tackiness may be measured by standard tack tests, such as the peel, rolling ball, or probe tack test. As used herein, tackiness may be measured on a scale of 0 to 5 where 0 signifies weak or no adhesion and 5 signifies full adhesion. For example, a probe tack method may be employed to measure tackiness on a scale of 0 to 5. To calibrate this test, PVC product substrate may be treated with an intermediary resin or solvent and a second PVC sample may be placed on top of PVC product substrate to test adhesion. In one example, PVC product substrate was treated with tetrahydrofuran and a PVC sample was placed on its surface. After 10 seconds, a test was performed whereby the PVC sample was easily removed from the PVC product substrate corresponding to an adherence level of 0. After 10 minutes, the PVC product substrate fully adhered the PVC sample, corresponding to full adhesion level of 5. Level 3 adhesion was achieved between 3 and 8 minutes.

On this scale, for most embodiments, the desired tackiness of a given product substrate or intermediary resin is typically about 3, which requires partially drying the surface to about half the maximum tackiness level prior to treatment with composition. Level 3 tackiness indicates that the PVC sample is partially adhered to the PVC product substrate. However, different levels of tack may be used for a given application of antimicrobial composition. By way of comparison, level 3 tackiness on this scale can be compared to a tack measurement of about 6 lbf/in +/−1 lbf/in standard deviation using the ASTM 2979 tack test. Other equivalent tests for tackiness as understood by a person of ordinary skill may be used.

Tackiness creates a temporary adhesive or softened layer where the mobility of the polymer chains is increased and this process is best suited to amorphous polymers which are also more flexible. Semi-crystalline polymers will also work within this system. Generally, the solvent-affected zone (SAZ) of the polymeric product substrate, may be between 1 and 1000 micrometers but is more typically between 50 and 500 micrometers, with deeper SAZ generally providing more durable biocidal films.

To form a biocidal film, an antimicrobial composition may be applied directly to a tacky plastic surface to provide the desired characteristics of antimicrobial power, visual appearance and clarity. In other embodiments, a biocidal film may be formed by first applying an intermediary resin to tacky plastic, then treating the resin with one or more antimicrobial compositions added to the resin surface. In still other embodiments, the biocidal film may be formed with intermediary resin mixed with one or more antimicrobial compositions that are added to a tacky plastic surface, then this resin-composition mixture treated with one or more antimicrobial compositions may be added to the resin surface. In preferred embodiments, the biocidal films described above may be further subjected to a final step comprising thermal processing to further imbed the biocidal film into the tacky plastic, and increase the surface area and interactions of the particles within the antimicrobial composition.

See Table 1 below for a list of solvents appropriate to create a tacky surface on common plastics:

TABLE 1

Suitable Solvents for Adhesion of Commonly Used Plastics

| Plastic | Solvent | | | | | | | |
|---|---|---|---|---|---|---|---|---|
| | Acetone | Cyclohexanone | N,N-Dimethyl formamide | Ethyl acetate | Dichloroethane | Dichoromethane | Glacial acetic acid | Methyl ethyl ketone |
| ABS | | | | | X | X | | X |
| Acrylic | | | | | X | X | X | |
| Cellulose acetate | X | | | X | | | | X |
| Polyaryl ether | X | | | X | | | | |

TABLE 1-continued

Suitable Solvents for Adhesion of Commonly Used Plastics

| Plastic | 1 | 2 | 3 | 4 | 5 | 6 | 7 | 8 |
|---|---|---|---|---|---|---|---|---|
| Polyaryl sulfone | | | X | | | | | |
| Polycarbonate | | | | X | | | X | |
| Polystyrene | | X | | X | | X | X | X |
| Polysulfone | | X | | | X | X | | X |
| PVC | X | X | | | | | | |
| PPO | | | | | X | X | | |
| Styrene-acrylonitrile | X | | | | | | X | |
| Vinylidene chloride | | X | X | | | | | |
| Polyamide | Formic acid, phenol, resorcinol or cresol in aqueous or alcoholic solutions, calcium chloride in alcoholic solution | | | | | | | |

| | Solvent | | | | | | |
|---|---|---|---|---|---|---|---|
| Plastic | 2-Methoxy ethanol | N-Methyl pyrrolidone | O-Dichlorobenzol | Tetrachloroethylene | Tetrahydrofuran | Toluene | Xylene |
| ABS | | | | X | | | |
| Acrylic | | | | | | | |
| Cellulose acetate | X | | | | | | |
| Polyaryl ether | | | | | | | |
| Polyaryl sulfone | | X | X | | | | |
| Polycarbonate | X | | | | | | |
| Polystyrene | X | X | X | | | X | X |
| Polysulfone | | | X | X | | X | X |
| PVC | X | | X | | X | | |
| PPO | | | | | | | |
| Styrene-acrylonitrile | | X | X | | | | |
| Vinylidene chloride | X | X | | | | | |
| Polyamide | Formic acid, phenol, resorcinol or cresol in aqueous or alcoholic solutions, calcium chloride in alcoholic solution | | | | | | |

Table 1 excerpted from the *Handbook of Plastic Joining, A Practical Guide,* 2$^{nd}$ Edition, Michael J. Troughton, ed., William Andrew Incorporated, 13 Eaton Avenue, Norwich NY 13815, p. 141, 2008.

Fibrous product substrates. In other embodiments, low viscosity resins, such as polyurethanes and other polymers, can be impregnated with the copper and applied onto fibrous product substrates, such as paper substrate, to create a partially absorbed antimicrobial interface that is highly durable and cost effective. The appropriate viscosity for polymers that may absorb into paper and other fibrous product substrates is approximately 50-450 cps. These resins may be applied through sprays, brushes, roll coating, and other common methods known by persons of ordinary skill in the art. This method may optionally include a drying phase to ensure desired tackiness and adhesion of the biocidal film to the product substrate.

Tapes and Adhesive Sheets. Biocidal films may also be applied to product substrates such as tapes or sheets with adhesive backing that can be applied to other surfaces requiring antimicrobial protection such as flooring, walls, bathrooms, restrooms, handles, knobs, hand rails tables, seating, appliances, medical equipment, medical facilities (e.g. hospitals, doctors' offices, clinics), public transportation (e.g. ships, planes, buses, trains, taxis) daycare facilities, schools, locker rooms, showers, fitness facilities (e.g. gyms, yoga, martial arts), long term care facilities and rehabilitation (e.g., nursing homes), food processing facilities, food service facilities, hotels, and many others.

Due to the antimicrobial strength of biocidal films described herein, preferred films and methods of making films may use very small amounts of surface antimicrobial composition allowing for near transparent applications. For example, preferred embodiments of copper-based biocidal films will have similar, or in some cases, superior antimicrobial power compared to pure copper. Some of these preferred embodiments may be clear or near transparent/translucent, and may further comprise patterns of antimicrobial composition with peaks and valleys arranged in a manner that maximizes both antimicrobial efficacy and clarity.

Intermediate resins for product substrates. For many product substrates, an intermediary resin may be used to form a biocidal film. The purpose of the intermediary resin is to bond the biocidal film to the product substrate and the antimicrobial composition to its surface. Intermediary resins used in biocidal films may be chosen for a combination of properties including, for example, binding capabilities, mechanical strength, temperature performance, thickness, flexibility, chemical resistance, durability and clarity.

In some embodiments, low viscosity resins, such as polyurethanes and other polymers, can be impregnated with the copper and applied onto fibrous product substrates, such as paper substrate, to create a partially absorbed antimicrobial interface that is highly durable and cost effective. The appropriate viscosity for polymers that may absorb into paper and other fibrous product substrates is approximately 50 to 450 cps, and preferably between 50 and 100 cps. These resins may be applied through sprays, brushes, roll coating, and other common methods known by persons of ordinary skill to create a thin uniform surface. This method may optionally include a drying phase to ensure desired tackiness and adhesion of the biocidal film to the product substrate.

In a preferred embodiment for paper, urethane may be applied to paper stock to produce a coated paper surface. The coated paper surface may optionally be allowed to dry and may be sprayed a second time with urethane if a thicker coat is desired. Application of the urethane layer is made to minimize gaps and other defects between these coatings and the substrate that could present a source of delamination. One or more antimicrobial compositions may then be applied to the surface of a tacky urethane coating to a desired coverage or thickness.

Examples of intermediary resins. Vinyl resins, such as vinyl esters, can be used on several product substrates because they are compatible with most surfaces, flexible and easily applied. Polypropylene resins are resistant to many caustic chemical solvents, acids and bases whereas Polystyrene can be a thermoplastic or a thermoset. Cellulose acetate and polyketones are other common resins that are useful as intermediary resins for several embodiments of biocidal films. There are also numerous clear and photoconductive resins available for embodiments requiring clear biocidal films and films comprising photoconductive elements.

Exemplary intermediary resins useful for several embodiments herein may include one or more of the following: polyvinyl chloride; polycarbonate; polystyrene; polyethylene terephthalate; acrylonitrile butadiene styrene; styrene acrylonitrile; ABS/Polyurethane Alloy; ABS/PVC Alloy; Acetal Copolymer, 10% Glass Fiber Reinforced; Acetal Copolymer, 20% Glass Fiber Reinforced; Acetal Copolymer, 30% Glass Fiber Reinforced; Acetal Copolymer, Impact Modified; Acetal Copolymer, PTFE Filled; Acetal Copolymer, Unreinforced; Acetal Homopolymer, Unreinforced; Acetal Homopolymer, Unreinforced, Impact Grade; Acrylic, Gamma Radiation Resistant, Molded; Acrylic, General Purpose, Molded; Acrylic, Heat Resistant, Molded; Acrylic, High Flow, Molded; Acrylic, Impact Modified, Molded; Acrylic, Optical Grade; Molded Acrylic/Polycarbonate Alloy; Acrylic, UV Stabilized, Molded; Acrylonitrile Butadiene Styrene (ABS), 10% Carbon Fiber Filled; Acrylonitrile Butadiene Styrene (ABS), 10% Glass Fiber Filled; Acrylonitrile Butadiene Styrene (ABS), 20% Carbon Fiber Filled; Acrylonitrile Butadiene Styrene (ABS), 20% Glass Fiber Filled; Acrylonitrile Butadiene Styrene (ABS), 30% Carbon Fiber Filled; Acrylonitrile Butadiene Styrene (ABS), 30% Glass Fiber Filled; Acrylonitrile Butadiene Styrene (ABS), 40% Carbon Fiber Filled; Acrylonitrile Butadiene Styrene (ABS), 40% Glass Fiber Filled; Acrylonitrile Butadiene Styrene (ABS), Carbon Black Filled; Acrylonitrile Butadiene Styrene (ABS), Heat Resistant, Molded; Acrylonitrile Butadiene Styrene (ABS), Impact Grade, Molded; Acrylonitrile Butadiene Styrene (ABS), Molded; Acrylonitrile Butadiene Styrene (ABS)/Nylon Blend; Acrylonitrile Butadiene Styrene (ABS), PTFE Filled; Acrylonitrile Butadiene Styrene (ABS), Transparent, Molded; Acrylonitrile Butadiene Styrene (ABS), Unreinforced, Flame Retardant; Alkyd (Polyester), General Purpose, Molded; Alkyd (Polyester), Molded, Asbestos Filled; Alkyd (Polyester), Molded, Glass Filled; Alkyd (Polyester), Molded, Mineral Filler; Diallyl Phthalate (DAP), Cast, Diglycol Carbonate Filler; Diallyl Phthalate (DAP), Cast, Mineral Filler; Diallyl Phthalate (DAP), Iron Powder Filled; Diallyl Phthalate (DAP), Molded, Fiber Filled; Diallyl Phthalate (DAP) Molding Compound, Long Glass Fiber Filled; Diallyl Phthalate (DAP) Molding Compound, Short Glass Fiber Filled; Epoxy/Carbon Fiber Composite; Epoxy, Cast, Aluminum Filled; Epoxy, Cast, Flexible Grade Epoxy, Cast, Silica Filled; Epoxy, Cast, Unreinforced; Epoxy, Cycloaliphatic, Molded; Epoxy Encapsulant, Unreinforced; Nylon 66, 10% Mineral Filled; Nylon 66, 20% Carbon Fiber Filled; Nylon 66, 20% Glass Fiber Filled; Nylon 66, 20% Mineral Filled; Nylon 66, 30% Carbon Fiber Filled; Nylon 66, 30% Glass Fiber Filled; Nylon 66, 30% Mineral Filled; Nylon 66, 40% Carbon Fiber Filled; Nylon 66, 40% Glass Fiber Filled; Nylon 66, 40% Mineral Filled; Nylon 66, 50% Carbon Fiber Filled; Nylon 66, 50% Glass Fiber Filled; Nylon 66/6; Nylon 66, 60% Glass Fiber Filled; Nylon 66/6, 10% Glass Fiber Reinforced; Nylon 66/6, 30% Glass Fiber Reinforced; Nylon 66/6, 40% Glass Fiber Reinforced; Nylon 66/6, 60% Glass Fiber Reinforced; Nylon 66, Heat Stabilized; Nylon 66, Impact Grade; Nylon 66, Unreinforced; Nylon 66, Unreinforced, Flame Retardant; Nylon 6, Heat Stabilized; Nylon 6, Impact Grade; Nylon 6, PTFE Filled; Nylon 6, Unreinforced; Nylon 6, Unreinforced, Flame Retardant; Nylon, Amorphous Transparent Alloy; Phenolic; Asbestos filled; Molded, Phenolic, Carbon Fiber Composite; Phenolic/Glass Fiber SMC; Phenolic, Graphite Cloth Composite; Phenolic, Novolac, Cellulose Filled; Phenolic, Novolac, Electrical Grade, Filled; Phenolic, Novolac, Fabric Filled; Phenolic, Novolac, Flock Filled; Phenolic, Novolac, Glass Fiber and Mineral Filled; Phenolic, Novolac, Glass Filled; Phenolic, Novolac, Glass/Flock Filled; Phenolic, Novolac, Heat Resistant Grade, Filled; Phenolic, Novolac, Impact Grade, Filled; Phenolic, Novolac, Mineral/Cellulose Filled; Phenolic, Novolac, Mineral/Fiber Filled; Phenolic, Novolac, Mineral Filled; Phenolic, Novolac, Mineral/Flock Filled; Phenolic, Novolac, Mineral/Glass Filled; Phenolic, Novolac, Mineral/Graphite Filled; Phenolic, Novolac, Woodflour Filled; Phenolic, Novolac, Woodflour/Mineral Filled; Phenolic, Resole, Electrical Grade; Phenolic, Resole, Glass Fiber Filled; Phenolic, Resole, Glass Fiber Filled; Phenolic, Resole, Mineral Filled; Phenolic, Resole, Mineral/Flock Filled; Phenolic, Resole, Mineral/Wood Filled; Phenolic, Resole, Wood Filled; Phenolic/Rubber-Asbestos filled; Molded, Phenolic/Rubber; Molded, Phenolic, Unreinforced; Molded, Phenolic, Wood and Flock filled; Molded, Polyarylsulfone; Molded/Extruded, Polyarylsulfone (PAS), Glass Fiber 10%; Polyarylsulfone (PAS), Glass Fiber 20%; Polyarylsulfone (PAS), Glass Fiber 30%; Polyarylsulfone (PAS), Glass Fiber 40%, Polybutylene Terephthalate (PBT), 10% Glass Fiber Filled; Polybutylene Terephthalate (PBT), 20% Glass Fiber Filled; Polybutylene Terephthalate (PBT), 30% Glass Fiber Filled; Polybutylene Terephthalate (PBT), 40% Glass Fiber Filled; Polybutylene Terephthalate (PBT), 50% Glass Fiber Filled; Polybutylene Terephthalate (PBT), Flame Retardant; Polybutylene Terephthalate (PBT), Heat Resistant; Polybutylene Terephthalate (PBT), Impact Grade; Polybutylene Terephthalate (PBT), Unreinforced, Molded; Polycarbonate, 10% Glass Filled; Polycarbonate, 20% Glass Filled; Polycarbonate, 30% Glass Filled; Polycarbonate, 40% Glass Filled; Polycarbonate, 50% Glass Filled; Polycarbonate/ABS Alloy, Unreinforced; Polycarbonate/ASA Alloy, Unreinforced; Polycarbonate, Gamma Radiation Resistant; Polycarbonate, High Heat, Polycarbonate, Impact Modified; Polycarbonate, Molded, Polycarbonate, Optical Grade; Polycarbonate/PET Polyester Blend; Polycarbonate/Polybutylene Terephthalate (PBT) Blend, Unreinforced; Polycarbonate/Polysulfone Alloy; Polycarbonate, PTFE Filled; Polycarbonate/Styrenic Alloy; Polycarbonate, Unreinforced, Flame Retardant; Polycarbonate, UV Stabilized; Polyester (Thermoset)—Flexible; Polyester (Thermoset); Molded; Synthetic Fiber Filler; Polyester (Thermoset)— Rigid, Polyetherimide; Polyetherimide, 10% Glass Fiber; Polyetherimide, 20% Glass Fiber; Polyetherimide, 30% Glass Fiber; Polyetherimide, 40% Glass Fiber; Polyetherimide, 50% Glass Fiber; Polyethersulfone (PES); Polyethersulfone (PES), 10% Glass Fiber Filled; Polyethersulfone (PES), 20% Glass Fiber Filled; Polyethersulfone (PES), 30% Glass Fiber Filled; Polyethersulfone (PES), 40% Glass Fiber Filled; Polyethylene Terephthalate (PET), 10% Glass Reinforced; Polyethylene Terephthalate (PET), 20% Glass Reinforced; Polyethylene Terephthalate (PET), 30% Glass Reinforced; Polyethylene Terephthalate (PET), 40% Glass Reinforced; Polyethylene Terephthalate (PET), 50% Glass Reinforced; Polyethylene Terephthalate (PET), 60% Glass Reinforced; Polyethylene Terephthalate (PET), Unreinforced; Polyethylene Terephthalate (PET), Unreinforced, Flame Retardant; Polyphenylene Ether, 10% Glass Filled; Polyphenylene Ether, 20% Glass Filled; Polyphenylene Ether, 30% Glass Filled; Polyphenylene Ether, 40% Glass Filled; Polyphenylene Ether, Heat Resistant; Polyphenylene Ether, Impact Grade; Polyphenylene Ether, Molded; Polyphenylene Ether+Styrene-Butadiene Blend; Polyphenylene Sulfide (PPS)–40% Glass filled; Molded; Polyphenylene Sulfide (PPS); Molded; Polyphenylene Sulfide (PPS) with 10% Carbon Fiber Filler; Polyphenylene Sulfide (PPS) with 10% Glass Fiber Filler; Polyphenylene Sulfide (PPS) with 20% Carbon Fiber Filler; Polyphenylene Sulfide (PPS) with 20% Glass Fiber Filler; Polyphenylene Sulfide (PPS) with 30% Carbon Fiber Filler; Polyphenylene Sulfide (PPS) with 30% Glass Fiber Filler; Polyphenylene Sulfide (PPS) with 40% Carbon Fiber Filler Polyphenylene Sulfide (PPS) with 50% Carbon Fiber Filler; Polyphenylene Sulfide (PPS) with 50% Glass Fiber Filler; Polyphenylene Sulfide (PPS) with 60% Carbon Fiber Filler, Polyphenylene Sulfide (PPS) with 60% Glass Fiber Filler; Polyphthalamide; Polyphthalamide, 10% Glass Fiber Reinforced; Polyphthalamide, 20% Glass Fiber Reinforced; Polyphthalamide, 30% Glass Fiber Reinforced; Polyphthalamide, 50% Glass Fiber Reinforced; Polyphthalamide, Glass Fiber 40%; Polyphthalamide, High Impact; Polypropylene, Carbon Fiber 10%; Polypropylene Copolymer; Polypropylene, Flame Retardant; Polypropylene, Impact Modified; Molded/Extruded; Polypropylene, Long Glass Fiber 50%; Polypropylene, Molded; Polypropylene with 10% Calcium Carbonate (CaCO3) Filler; Polypropylene with 10% Glass Fiber Filler; Polypropylene with 10% Mica Filler; Polypropylene with 10% Mica Filler; Polypropylene with 10% Talc Filler; Polypropylene with 20% Calcium Carbonate (CaCO3) Filler; Polypropylene with 20% Glass Fiber Filler; Polypropylene with 20% Mica Filler; Polypropylene with 20% Talc Filler; Polypropylene with 30% Calcium Carbonate (CaCO3) Filler; Polypropylene with 30% Glass Fiber Filler; Polypropylene with 30% Mica Filler; Polypropylene with 30% Talc Filler; Polypropylene with 40% Calcium Carbonate (CaCO3) Filler; Polypropylene with 40% Glass Fiber Filler; Polypropylene with 40% Mica Filler; Polypropylene with 40% Talc Filler; Polypropylene with 50% Mica Filler; Polypropylene with 60% Chopped Glass Filler; Polystyrene; Polystyrene, Flame Retardant; Polystyrene, Heat Resistant Grade; Polystyrene, Impact Modified; Polystyrene+Polyphenylene Ether+Nylon, Unreinforced; Polystyrene+Polyphenylene Ether, Unreinforced; Polystyrene, Transparent Grade; Polysulfone; Polysulfone, 10% Glass Fiber Reinforced; Polysulfone, 20-30% Carbon Fiber Reinforced; Polysulfone, 20% Glass Fiber Reinforced; Polysulfone, 30% Glass Fiber Reinforced; Polysulfone, 40% Carbon Fiber Reinforced; Polysulfone, 40% Glass Fiber Reinforced; Polysulfone with 7% Stainless Steel Filler; Polysulfone with PTFE/Silicone Filler; Polyurethane, Cast, Unsaturated; Poly-Vinyl Chloride (PVC), 10% Glass Fiber Reinforced; PVC, 20% Glass Fiber Reinforced; PVC, 30% Glass Fiber Reinforced; PVC, High Impact; PVC, Molded; PVC, Transparent; Styrene Acrylonitrile (SAN), Molded; Styrene Acrylonitrile (SAN), Transparent; Styrene-Maleic Anhydride (SMA); Styrene-Maleic Anhydride (SMA), Heat Resistant; Styrene-Maleic Anhydride (SMA) with 10% Glass Fiber Filler; Styrene-Maleic Anhydride (SMA) with 20% Glass Fiber Filler; Styrene-Maleic Anhydride (SMA) with 20% Glass Fiber Filler; Styrene-Maleic Anhydride (SMA) with 30% Glass Fiber Filler; Styrene-Maleic Anhydride (SMA) with 40% Glass Fiber Filler; Thermoset Polyester Glass and Mineral Filled BMC; Thermoset Polyester Glass Filled BMC; Thermoset Polyester Glass SMC; Thermoset Polyester, Mineral Filled; Thermoset Polyurethane, Elastomer, Glass Filled; Thermoset Polyurethane, Elastomer, Unreinforced; Thermoset Polyurethane Foam, Glass Filled; Thermoset Polyurethane Foam, Unreinforced; Thermoset Polyurethane, Liquid, Quartz Filled; Thermoset Polyurethane, Solid RIM; Very Low Density Polyethylene (VLDPE).

Thermal processing of biocidal films using rollers or presses. The metallic elements and other ingredients in antimicrobial compositions may optionally be heat pressed onto the surface of a resin to create a biocidal film with a minimally thin layer of composition on its surface. Surprisingly and unexpectedly, it was found that this optional thermal processing of biocidal films provides antimicrobial activity that approximates and, in some cases, is superior to that of pure copper metal, which has well-established and antimicrobial power.

The power of the biocidal films described herein is particularly surprising and unexpected given the small amount of antimicrobial metal used during manufacture. This process maximizes both the surface area and interaction of the ingredients of the antimicrobial composition and deeply bonds the composition to the resin surface, while minimizing the required application of the composition to provide a cost effective, efficient, and useful replacement for caustic, environmentally unfriendly, and otherwise expensive antimicrobial treatments.

In some embodiments, biocidal films may be thermally processed with approximately 2.5 kilograms of force per square inch under a temperature of 500 degrees F. (260 degrees Celsius) for approximately 10 seconds. Thermal processing may be performed using a system of one or more mechanical rollers or presses. In some embodiments, rollers may also be used to apply intermediary resin on which antimicrobial composition may be applied.

In one example, a plastic product substrate treated with a copper antimicrobial composition was pressed with a multipurpose 14"×16" heat plate. In this example, the film exhibited greater biocidal power than that of a solid copper plate, with about fifty times the amount of copper by weight, which was used as a comparison with known antimicrobial power. (See Table 2, for example.)

In some embodiments, the product substrate with a biocidal film may be fed through a heated roller system. Paper, plastic sheets, and tapes are examples of product substrates that may be fed through mechanical rollers. In some embodiments, rollers may also be used to both apply and imbed compositions to the substrate. Thermal processing is also scalable for larger applications, for example when adding biocidal films to floors, where such films can be compressed with mobile rolling devices or presses.

Clear biocidal films. When clear biocidal films are desired, the films may comprise transparent intermediary resins and antimicrobial compositions modified with additives, such a photoconductive elements or polymers, to increase the antimicrobial strength of the film and visibility of the underlying product substrate. For clear biocidal films, loading of the antimicrobial composition on the film may be between 0.0025 and 0.15 grams per square inch, and preferably between 0.025 and 0.075 grams per square inch. The loading amount of antimicrobial composition used may be altered depending on the desired biocidal power of the film, the desired clarity of the film, and the relative strength of the antimicrobial composition used. In some embodiments using plastic product substrates, such as clear plastic sheets and adhesive tapes, the use of intermediary resins may be avoided by treating the surface of the product substrate with a solvent to create a tacky surface, then adding the antimicrobial composition directly to the product substrate surface. This process sometimes creates biocidal films with greater clarity than those incorporating intermediary resins.

Ridges and valleys on surface of biocidal films. In some embodiments, clarity and antimicrobial efficacy may be optimized with the inclusion of micro-ridges on the film surface of biocidal films that minimize the touchable surface area while optimizing the transparency of the film. Micro-ridges comprise raised areas of biocidal film on a product substrate and should be spaced to maximize the passage of light and clarity through the valleys to see the underlying product substrate.

Micro-ridges comprise raised areas of biocidal film on a product substrate. These ridges may comprise raised lines, curves, rows, shapes, spots or other repetitive patterns with repetitive "low points" or "valleys" between the ridges comprising areas of no biocidal film, thinner film, or film with less antimicrobial composition. In preferred embodiments, the ridges and valleys should be spaced such that people touching the surface make contact with only the biocidal film ridges to maximize antimicrobial power, while the valleys allow for maximized passage of light and clarity to see the underlying product substrate. Ranges for spacing between ridges can vary from about a micrometer to a about a centimeter, with preferred ranges of about 0.1 to 2.5 mm.

In one or more embodiments, translucent or transparent resins may be used to enhance the clarity of the composition and allow light to permeate through both ridges and valleys to the underlying product substrate. Moreover, and in some preferred embodiments, clear resin may be used with photoconductive compositions to maximize the permeation of light throughout the composition and thus its ionization and biocidal activity.

Figure 3:
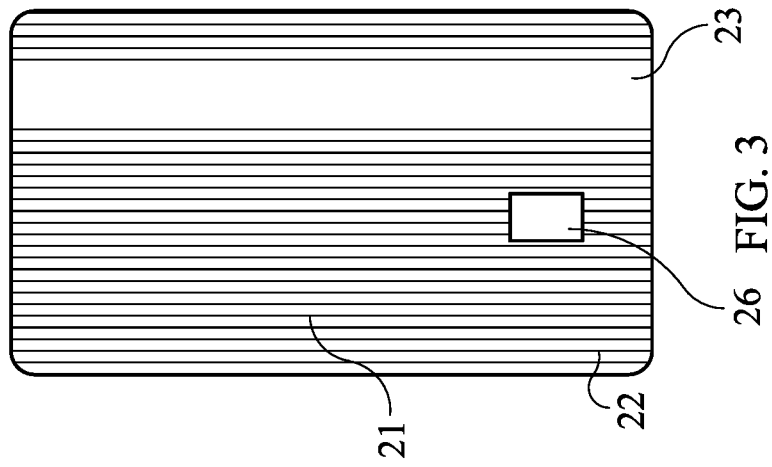
FIG. 3 is a top view of a schematic cross section showing antimicrobial ridges according to one embodiment of the present disclosure in a parallel arrangement.
Figure 4:
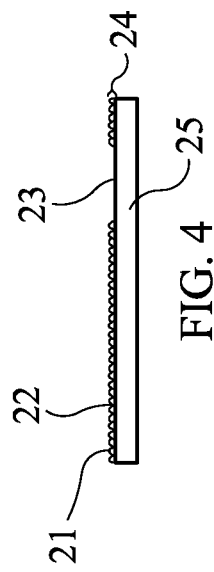
FIG. 4 is a side view of a schematic cross section showing antimicrobial ridges according to one embodiment of the present disclosure in a parallel arrangement.

The following relate to examples of using ridges and valleys in the claimed compositions. FIG. 3 and side view FIG. 4 depict an exemplary embodiment of a biocidal film 24 with film ridges 21 and film valleys 22. Product substrate 25 depicts a credit card with an antimicrobial composition concentrated on ridges 21 of the film 24. Valleys 22 of the film 24 contain a thinner area of film 24 and minimized application of antimicrobial composition. In preferred embodiments, the film 24 may comprise a clear intermediary resin to improve transparency and visibility of the product substrate's underlying surface. Customized optional cutouts containing minimized or no application of antimicrobial composition are also depicted in 23 and 26, where the product substrate 25 may include a magnetic strip or chip typical to most credit cards. These cutouts 23 and 26 are not necessary as the credit card may function when coated with biocidal film.

Figure 6:
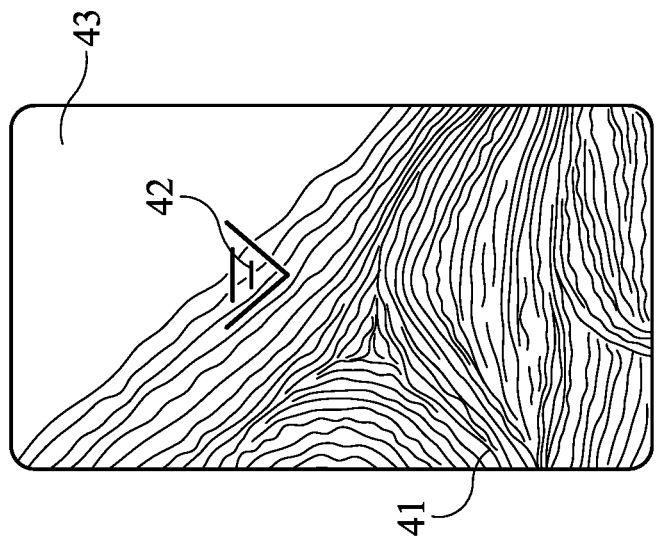
FIG. 6 is a top view of a schematic cross section showing antimicrobial ridges according to one embodiment of the present disclosure in a swirl ridge arrangement.
Figure 5:
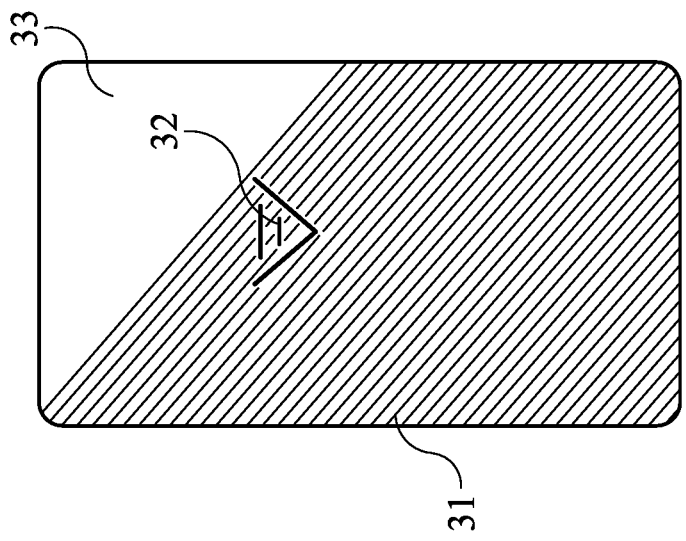
FIG. 5 is a top view of a schematic cross section showing antimicrobial ridges according to another embodiment of the present disclosure in an angled parallel ridge arrangement.

FIG. 5 and FIG. 6 depict customized embodiments of biocidal films comprising ridges and valleys. FIG. 5 depicts a ridged biocidal film 31 with an angled design. In this embodiment, the film 31 comprises ridges with antimicrobial composition separated by valleys with little to no film or antimicrobial composition. Untreated product substrate 33 is shown for comparison. In this embodiment, the distance between the biocidal film 31 ridges should be less than 0.5 millimeter, and preferably less than 0.25 mm. This embodiment of biocidal film allows branding and underlying designs 32 of the product substrate to remain visible through the biocidal film.

FIG. 6 depicts another embodiment of a ridged biocidal film comprising non-parallel arrays of swirled antimicrobial composition ridges 41 and valleys 43 with little to no biocidal film or antimicrobial composition. The ridges are placed with varying distances between the antimicrobial ridges 41 and untreated valleys 43. In this embodiment, the ridges and valleys may be spaced within a range of about 0.1 and 0.5 millimeters to allow for the underlying design 42 of the product substrate to be visible through the biocidal film. This embodiment shows how ridges can be made using any type of design or pattern to provide antimicrobial protection while maintaining visibility of the underlying surface.

Figure 7:
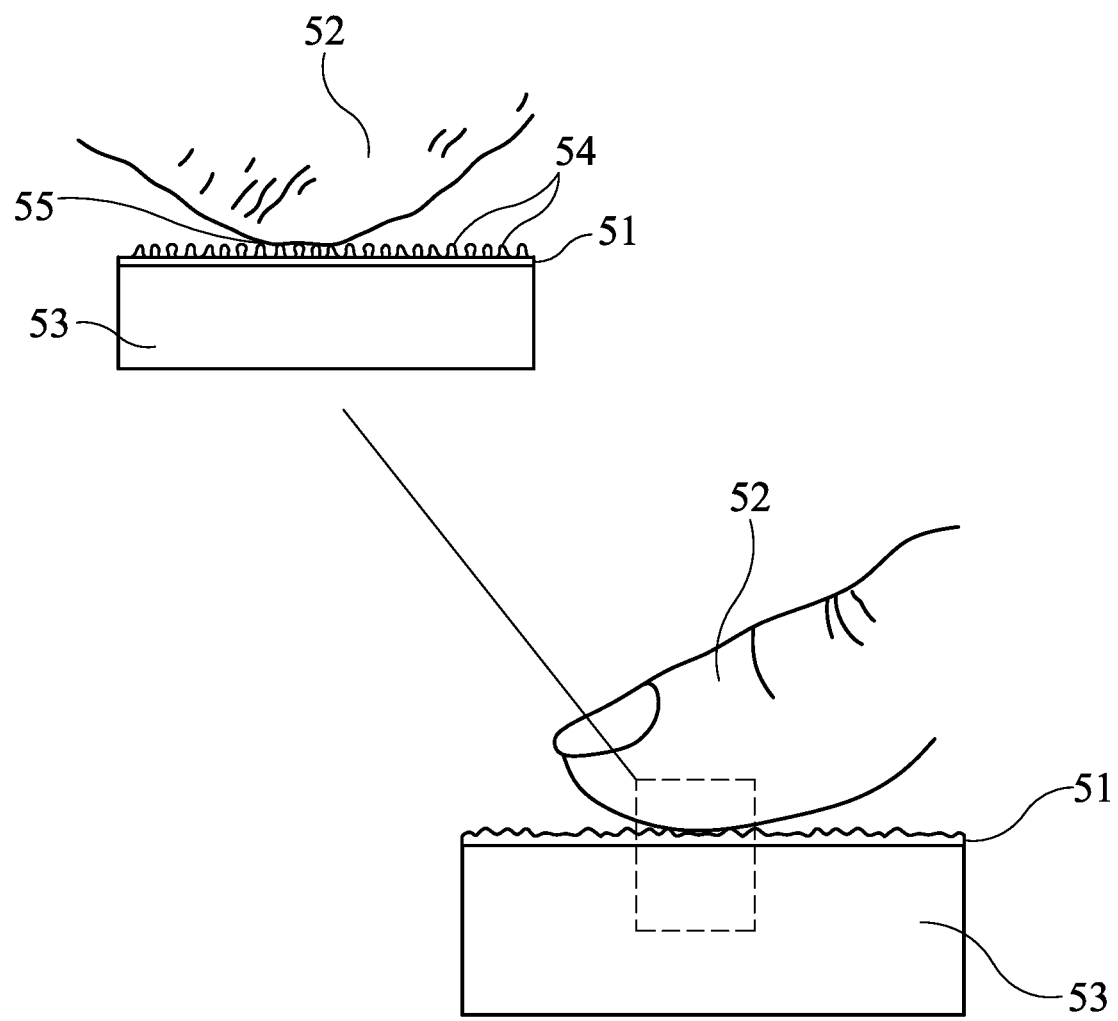
FIG. 7 shows characteristics of a ridged design embodiment.

The spacing of the biocidal ridges of a film allows for enhanced clarity and performance of ridged biocidal films. FIG. 7 depicts an embodiment of a ridged biocidal film 54 applied to the surface of a clear adhesive tape product substrate 51. When the adhesive tape product substrate 51 is applied to a target surface 53, the ridged biocidal film will preferably have spaces between the ridges such that when touched, a finger 52 will only make contact with the ridges, and not the underlying valleys of the product substrate 51 or the target surface 53. As shown in 55, the finger 52 touches only the ridges of the biocidal film 54, and not the valleys or the underlying target surface 53. This allows for an antimicrobial adhesive tape that can be applied to any surface requiring maximized antimicrobial production while maintaining visibility of the underlying product substrate. In preferred embodiments, clear resins and minimal composition comprising photoconductive additives may be used to enhance the clarity and the biocidal power of the film and to allow light to permeate through both ridges and valleys to the underlying product substrate.

Testing Exemplary Biocidal Films

To determine the efficacy of the biocidal films, applicant tested two biocidal films imbedded on plastic product substrates using a modified version of the testing protocol recommended by the Environmental Protection Agency (EPA)—*Protocol for the Evaluation of Bactericidal Activity of Hard, Non porous Copper Containing Surface Products.*

The use of e raised to power is a short-hand manner of stating concentrations. For example, $4.4\,e^9$ cfu/ml is $4.4\times10^9$ cfu/ml. "Colony-forming units" (cfu) as used in this section are used to measure the efficacy of the biocidal films in comparison with a control and pure copper samples. A "cfu" is generally a unit used in microbiology to estimate the number of viable microbes in a sample. The term "viable" is defined as the ability to survive and reproduce under controlled conditions. Counting with cfu requires culturing the microbes and counting viable cells, in contrast with microscopic examination which counts all cells, living or dead.

Applicant evaluated three duplicate production lots in each of two biocidal films respectively labeled "Copper Powder" and "Copper Blend" using this protocol. Applicant tested the biocidal activity of these films against *Staphylococcus aureus* (ATCC 6538) which is a well-known strain of methicillin-resistant *Staphylococcus aureus* (MRSA).

For this test, frozen *S. aureus* was used to inoculate a new working culture of bacteria. The working stock was quantified via enumeration to have a concentration of $4.4e^9$ cfu/mL. This working stock was diluted to create a spiking dilution that was verified via enumeration to have a concentration of $6.25\,e^7$ cfu/mL of viable bacteria, and enumeration of the inoculated samples indicated exposure of $1.25e^6$ cfu/product. All plating was done using TSA media and plates were counted at 24 hours and 48 hours. Three samples of stainless steel were used as a control group and three samples of pure copper metal were used as a comparative standard having well-established antimicrobial power.

Copper Powder biocidal film. The three samples of the Copper Powder biocidal film were prepared for testing. About 6 grams of a blend of 30% copper powder (about 45 μm particle size) antimicrobial composition and 70% vinyl resin powder by weight was made to form an antimicrobial matrix.

A 3×3 inch vinyl sheet product substrate was treated with a thin coat of tetrahydrofuran solvent, then partially dried for about 4 minutes to give the surface an approximate level 3 tackiness. This tacky surface was treated with the antimicrobial matrix. The surface of the antimicrobial matrix was then treated with an additional amount of about 0.5 grams of pure copper powder, and the film was thermally processed with 5 pounds of pressure at 500 degrees Fahrenheit to create a uniform biocidal film over the product substrate.

Copper Blend Biocidal film. Three samples of the Copper Blend biocidal film were prepared for testing using the same preparation as above, except for the antimicrobial composition. For the Copper Blend, the antimicrobial composition comprised approximately 1.5 grams of 25% copper powder in 75% selenium powder (about 45 um particle size) and was mixed with 4.5 grams of vinyl resin to form an antimicrobial matrix, and an additional amount of about 0.5 grams of the copper powder was deposited on the surface of the antimicrobial matrix.

Comparison of Copper Powder Biocidal film with control and a Pure Copper Sample. Results of this test showed that the sample films labeled "Copper Powder" demonstrated a complete reduction in viable bacteria. These biocidal films not only showed significant killing power over the stainless steel control, but surprisingly also showed superior biocidal activity compared to the pure copper sample which contained approximately fifty times more surface copper metal by weight. The pure copper samples supported an average of one colony of viable bacteria during the 48-hour counts for a bactericidal activity of about 99.95%. The Copper Powder embodiments supported no viable bacterial colonies for 100% bactericidal activity.

Comparison of Copper Blend Biocidal film with control and a Pure Copper Sample. The samples of biocidal film labeled Copper Blend comprised significantly less copper than the Copper Powder sample, and while it did not demonstrate a complete reduction in viable bacteria, it still demonstrated killing power substantially the same as that of the pure copper sample with approximately 99.7% bactericidal activity versus the pure copper samples having the mentioned 99.95% bactericidal activity. The results of the copper blend embodiments were surprising and unexpected as its bactericidal activity was substantially the same as that of the pure copper samples which had approximately fifty times more surface copper metal by weight.

Results of the foregoing tests for Stainless Steel control, pure copper, Copper Powder Biocidal film and Copper Blend Biocidal film are shown in the following Table 2:

TABLE 2

Bactericidal Activity Summary

| Product | Number of Bacteria Exposed | Number of Bacteria Recovered | Total Bactericidal Activity | Percentage Bactericidal Activity | Log Reduction (LR) |
|---|---|---|---|---|---|
| Stainless Steel | 1.25e6 cfu | 6.39e5 cfu | n/a | n/a | n/a |
| Pure Copper | 1.25e6 cfu | 6.67e2 cfu | 1.249e6 cfu | 99.95% | 6 |
| Copper Powder | 1.25e6 cfu | 0 cfu | 1.25e6 cfu | 100% | 6 |
| Copper Blend | 1.25e6 cfu | 3.8e3 cfu | 1.246e6 cfu | 99.7% | 2 |

Examples

The following examples illustrate different examples of the claimed compositions and processes that are intended as illustrations only, since numerous modifications and variations within the scope of the present disclosure will be apparent to those skilled in the art.

Tackiness as measured by the mentioned exemplary probe tack method was measured on a rated scale of 1 to 5, with 1 being non-tacky and 5 being affixed. Unless otherwise noted, all parts, percentages, and ratios reported in the following examples are on a weight by weight basis, and all reagents used in the examples were obtained, or are available, from Sigma Aldrich Chemical Co., St. Louis, Mo. or other chemical suppliers.

Example 1—Method for Ridged Biocidal Film on Clear Vinyl Adhesive Tape Substrate The following relates to preparation of a biocidal film using a vinyl product substrate and powders of mixed copper and selenium components. An antimicrobial composition comprising 95% copper powder and 5% selenium with particle size of about 45 micrometers is prepared and blended 1:1 with clear PVC resin powder to make an antimicrobial matrix.

A sheet of transparent vinyl product substrate with adhesive backing is sprayed with tetrahydrofuran on the surface opposite the adhesive, and the surface is allowed to dry to a tackiness level of 3.

The antimicrobial matrix is suspended in a solution of isopropyl alcohol to make a suspension. The suspension is applied to a rotating barrel having dimensions of 0.25 mm deep grooves and 0.5 mm in width. Excess suspension is removed from the high points of the rotating barrel so that a thin layer of suspension is concentrated in the grooves. Rotating barrels are well-known to a person of ordinary skill in the art.

The vinyl product substrate is rolled and subjected to pressure between the mentioned rotating barrel and a second heated barrel which is heated to 500 degrees Fahrenheit. The vinyl product substrate with a see-through ridged application of biocidal film has a greater concentration of antimicrobial composition and film thickness on the ridges than the valleys, and is allowed to dry and cool to room temperature to form a clear antimicrobial vinyl sheet for application onto various surfaces.

Example 2—Method for Ridged Biocidal Film on Vinyl Substrate

About 5 ml Tetrahydrofuran is applied to a vinyl product substrate and allowed to dry to a tackiness level of 3. A polyurethane coating with about 150 cps viscosity is then sprayed by inkjet onto the surface of the product substrate to form lines about 0.25 mm wide and about 2.5 mm apart to form ridges of biocidal film and valleys of no biocidal film. The coated product substrate is then allowed to dry to a tackiness level of 3, and is then treated with antimicrobial composition comprising 95% copper powder and 5% selenium powder with an average particle size of about 45 micrometers that is evenly distributed onto the surface of the polyurethane lines to form a biocidal film. Weight of distribution per square inch of ridged biocidal film can vary in a range of about 0.0025 to about 0.1 grams per square inch, with less material improving the transparency of the film. The coated system is allowed to dry to provide a see-through ridged copper-based biocidal film over a vinyl product substrate.

Example 3—Thermally Treated Biocidal Film on Vinyl Substrate

The following relates to preparation of another embodiment of a biocidal film using a vinyl product substrate and powders of mixed copper and selenium components.

An antimicrobial composition comprising 95% copper powder and 5% selenium powder with an average particle size of about 45 micrometers was prepared.

A 3.0 inch by 3.0 inch clear vinyl product substrate sheet was sprayed with 25% acetone/25% tetrahydrofuran/50% isopropyl alcohol solution. The vinyl sheet was allowed to dry to a tackiness level of 3.

About 5 grams of the antimicrobial composition comprising 100% copper were evenly distributed on the surface of the dried vinyl sheet. After drying, the coated vinyl sheet was placed between 2 sheets of 5 mil aluminum foil. The coated vinyl between 2 sheets of aluminum foil was placed in a heated press at 500 degrees Fahrenheit for 10 seconds. The system was allowed to cool to room temperature and the aluminum was peeled off to reveal vinyl product substrate with a copper-based biocidal film.

Example 4—Biocidal Film on Vinyl Flooring Product Substrate

The following relates to preparation of a biocidal film on a vinyl product substrate and powders of copper.

An antimicrobial composition comprising 20 grams Copper powder with particle size of 45 micrometers is blended with 75 grams of Vinyl powder intermediary resin.

A square foot of vinyl floor product substrate is treated with 50 mL tetrahydrofuran, and the coated vinyl floor is allowed to dry to a tackiness level of about 3. The antimicrobial composition is then evenly distributed onto the surface of the vinyl floor product substrate, followed by an additional 5 grams of copper powder evenly distributed on the surface, and the resultant film is allowed to dry.

After drying, the biocidal film on the vinyl flooring product substrate is covered with 5 mil aluminum foil and thermally treated with a weighted press at 500 degrees Fahrenheit for 10 seconds. The biocidal film is allowed to cool to room temperature and the aluminum is peeled off to reveal vinyl flooring with a copper-based biocidal film.

Example 5—Photoconductive Biocidal Film on Vinyl Product Substrate

The following relates to preparation of a biocidal film using a vinyl product substrate and powders of mixed copper and selenium components.

An antimicrobial composition comprising 20 grams of Copper powder with particle size range of 45 micrometers and 2 grams of selenium powder with a particle size of about 45 micrometers was blended with 70 grams of Vinyl powder intermediary resin.

The surface of vinyl product substrate measuring 3×3 inches was treated with tetrahydrofuran, and the coated vinyl sheet was allowed to dry to a tackiness rating of 3.

5 grams of the blended powder were evenly distributed onto the surface of the vinyl sheet, followed by an additional 0.5 grams each of additional copper and selenium powder, and was allowed to dry. After drying, the coated vinyl sheet was placed between 2 sheets of 5 mil aluminum foil. The coated vinyl between 2 sheets of aluminum foil was placed in a heated press at 500 degrees Fahrenheit for 10 seconds. The system was allowed to cool to room temperature and the aluminum was peeled off to reveal vinyl product substrate with a photoconductive copper-based biocidal film.

Example 6—Photoconductive Biocidal Film on PVK Product Substrate

The following relates to preparation of a biocidal film using a PVK product substrate and powders of mixed copper and selenium powders.

5 grams of Copper powder and 1 gram of selenium powder each with an average particle size ranges of about 45 micrometers are blended to make a photoconductive antimicrobial composition.

Tetrahydrofuran is deposited onto a sheet of poly(vinyl carbazole) (PVK), a temperature resistant and photoconductive substrate, for 20 seconds and the PVK sheet is allowed to dry to a tackiness of 3 rating.

The antimicrobial composition is evenly distributed on the surface of the PVK sheet and the coated system is allowed to dry.

Post drying, the coated sheet is placed between 2 sheets of 5 mil aluminum foil. The coated vinyl between 2 sheet of aluminum foil is placed in heated press at 500 degrees Fahrenheit for 10 seconds. The system is allowed to cool to room temperature and the aluminum is peeled to reveal PVK with a photoconductive copper-based biocidal film.

This example uses powders of mixed copper and selenium components, but alternatively, powders of copper alone may be used, as understood by a person of ordinary skill in the art in view of the teachings of the specification.

Example 7—Biocidal Film on Paper Product Substrate

The following relates to preparation of a biocidal film using a paper product substrate and powders of mixed copper and selenium components.

A polyurethane coating with a viscosity of 150 cps is sprayed onto a paper product substrate. The coated paper is allowed to dry to a tackiness level of 3. The polyurethane-coated paper is then sprayed with polyurethane again, and an antimicrobial composition comprising 90% copper powder and 10% selenium is evenly distributed onto the surface of the paper at an amount of about 0.025 g per square inch. The coated system is allowed to dry to provide a photoconductive clear copper-based biocidal film.

This example uses powders of mixed copper and selenium components, but alternatively, powders of copper alone may be used, as understood by a person of ordinary skill in the art in view of the teachings of the specification.

Example 8—Biocidal Film on Wood Flooring Product Substrate

The following relates to preparation of a biocidal film using a wood product substrate and powders of copper.

A polyurethane coating with a viscosity of 150 cps is rolled onto wood flooring product substrate. The coated wood is allowed to dry to a tackiness level of 3. An antimicrobial composition comprising copper powder with an average particle size of 100 micrometers (for durability and traction) is then evenly distributed onto the surface of the wood at an amount of about 5 grams per square foot. The coated system is allowed to dry to provide a copper-based biocidal film over wood flooring substrate.

This example uses powders of copper alone, but alternatively powders of mixed copper and selenium components may be used, as understood by a person of ordinary skill in the art in view of the teachings of the specification.

Example 9—Leather Product Substrate

The following relates to preparation of a biocidal film using a leather product substrate and powders of copper.

A polyurethane coating with a viscosity of 150 cps was sprayed onto leather product substrate. The coated 6×6 inch leather substrate was allowed to dry to a tackiness level of 3. The tacky surface was then treated with an even distribution of 10 grams of an antimicrobial composition comprising 22% copper powder with particle size range of 45 micrometers and 78% vinyl powder intermediary resin. The coated leather substrate was then placed between 2 sheets of aluminum foil and placed in a heated press at 500 degrees Fahrenheit for 10 seconds. The system was allowed to cool to room temperature and the aluminum was peeled off to reveal leather product substrate with a copper-based biocidal film.

This example uses powders of copper, but alternatively, powders of copper and selenium may be used, as understood by a person of ordinary skill in the art in view of the teachings of the specification.

Example 10—Metallic Product Substrate

The following relates to preparation of a biocidal film using a metallic product substrate and powders of copper.

A stainless steel product substrate was cleaned and lightly scoured. The surface of the scoured stainless steel product substrate was treated with sprayed acrylic resin. The coated product substrate is then allowed to dry to a tackiness of level of 3, and an antimicrobial composition comprising copper powder ranging from 30-45 micrometers is evenly distributed onto the surface of the product substrate at an amount of about 0.05 grams per square inch.

The coated system is allowed to dry to provide a copper-based biocidal film over the stainless steel product substrate.

This example uses powders of copper alone, but alternatively powders of mixed copper and selenium components may be used, as understood by a person of ordinary skill in the art in view of the teachings of the specification.

The claims are not limited by the preferred embodiments and examples, but will cover many modifications and equivalents consistent with the written description as a whole.

I claim:

1. A surface coating for a product substrate comprising:
   a biocidal composition comprising:
   a powder of core metal or compounds thereof comprising one or more of the following:
   copper, silver and gold; wherein the powder has a particle size of 5 to 100 micrometers, and a weight percentage of the core metal is in a range from 10% by weight to 95% by weight of the composition;
   a photoconductive additive comprising one or more of the following:
   selenium and selenium powders; compounds of selenium and powders of compounds of selenium; and salts of selenium and powders of the salts of selenium; and
   optionally, a photoconductive additive comprising one or more of the following:
   thallous oxide;
   carbazole-containing polymers; and
   triarylamine-containing polymers;
   wherein the core metal compounds thereof are oxides of the core metal or halides of the core metal; and
   wherein the surface coating forms a biocidal film on the surface of the product substrate where the core metal or compounds thereof in combination with selenium, selenium compounds or selenium salts provide a synergistic effect to the biocidal film.

2. The surface coating of claim 1, further comprising at least one resin for applying to the product substrate, wherein the biocidal composition comprises up to about 90% by weight copper powder having a particle size of about 10 to 100 micrometers and about 10% by weight of selenium powder having a particle size of about 10 to 100 micrometers, and the biocidal composition is applied over the resin to form the biocidal film.

3. The surface coating of claim 2, wherein the biocidal film comprises ridges, wherein the ridges comprise raised areas of the product substrate.

4. The surface coating of claim 1, wherein the powder of core metal is copper powder, the photoconductive additive is selenium powder, and the copper powder comprises up to about 95% by weight of the biocidal composition and the selenium powder comprises up to about 5% by weight of the biocidal composition.

5. The surface coating of claim 4, wherein the copper and selenium powders each have a particle size range of about 20 to 80 micrometers.

6. The surface coating of claim 2, wherein the resin is a vinyl resin.

7. The surface coating of claim 2, wherein the at least one resin is a clear resin and resides on the surface of the product substrate and the at least one biocidal composition is disposed on the surface of the at least one resin.

8. The surface coating of claim 6, wherein the vinyl resin is polyvinyl carbazole.

* * * * *